United States Patent Office 2,932,941
Patented Apr. 19, 1960

2,932,941
SULFENAMIDES AND THIOSULFENAMIDES AS HYPERGOLIC FUELS

Arnold L. Ayers, Idaho Falls, Idaho, and Cleveland R. Scott, Bartlesville, Okla., assignors to Phillips Petroleum Company, a corporation of Delaware No Drawing. Application November 8, 1951
Serial No. 255,529

11 Claims. (Cl. 60—35.4)

This invention relates to rocket propellants. In one of its more specific aspects this invention relates to hypergolic fuels and their application to the propulsion of rockets.

Our invention is concerned with new and novel rocket propellants and their utilization; a rocket or jet propulsion device, being defined herein as a rigid container for matter and energy so arranged that a portion of the matter can absorb energy in kinetic form and subsequently be ejected in a specified direction. The type rocket to which our invention is applied is that type of jet propulsion device designated as a "pure" rocket, i.e., a thrust producer which does not make use of the surrounding atmosphere. A rocket of the type with which our invention is concerned is propelled by introduction of a propellant material into a combustion chamber therein, and burning it under condition that will cause it to release energy at a high but controllable rate immediately after entry into the combustion chamber. Rocket propellants, as liquid, are advantageously utilized inasmuch as the liquid propellant material can be carried in a light weight, low pressure vessel and pumped into the combustion chamber, the latter though it must withstand high pressure and temperature, being only necessarily large enough to insure combustion. Also, the flow of liquid propellant into the combustion chamber can be regulated at will so that the thrust, continuous or in intermittent bursts of power, can be sustained, the latter type of liquid propellant flow contributing to a longer life of the combustion chamber and thrust nozzle.

Various liquids and liquid combinations have been found to be useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine, or hydrogen; and nitric acid as the oxidizer with aniline or furfuryl alcohol as the hypergolic fuel component.

When employing 90–100 percent or more nitric acid, i.e., "white fuming nitric acid" as the oxidizer in a rocket bipropellant, it is often necessary, dependent on the specific fuel component, to make ignition more prompt by dissolving from 6 to 14 percent by weight of nitrogen dioxide in the white fuming nitric acid forming thereby "red fuming nitric acid." A fuel component of a bipropellant material of the type described herein, is spontaneously ignited upon contacting the oxidizer, and for that reason is referred to herein as being "hypergolic." A ratio of oxidizer to hypergolic fuel based on stoichiometric amounts can be utilized within the limits of 0.5:1 to 1.5:1 if desired, the efficiency of the combustion being less at ratios below 1:1 and the use of the oxidizer being less economical at ratios above 1:1. However, practical considerations may necessitate the use of higher ranges, even as high as 6:1.

An object of this invention is to provide new rocket propellants. Another object is to provide hypergolic fuels. Another object is to provide a method for producing immediate thrust to a rocket. Other objects will be apparent to those skilled in the art from the accompanying discussion and disclosure.

In accordance with a broad embodiment of our invention we have provided rocket bipropellant materials, the fuel component of which comprises organic sulfenamides made up of atoms selected from the group consisting of carbon, hydrogen, sulfur, nitrogen and oxygen. More specifically, we have discovered that organic sulfenamides particularly sulfenamides having more than 5 and not more than 24, preferably not more than 17 carbon atoms per molecule, are suitable for use in propellant systems wherein hypergolic fuels are utilized. These sulfenamides comprise compounds which are characterized by the structural formula

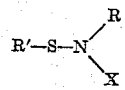

wherein X is selected from the group consisting of a hydrogen atom and an SR′ group, wherein R is an alkyl or cycloalkyl group containing from 3 to 8 carbon atoms and wherein R′ is an alkyl group containing from 2 to 7 carbon atoms. Typical compounds within this group include N-normal butyl-S-tertiary-butyl sulfenamide, N-cyclohexyl-S-tert-butyl sulfenamide and the like.

Another group of sulfenamides which are suitable for use in propellant systems wherein hypergolic fuels are utilized are characterized by the structural formula

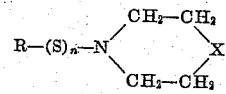

wherein R is an alkyl group containing from 2 to 12 carbon atoms and wherein X is a methylene group, a nitrogen atom, a sulfur atom or an oxygen atom and wherein n is a whole integer selected from a group of 1 to 2 and wherein when X is an oxygen atom, n is 2. Typical compounds within this group include tert-butyl thiosulfenylpiperidine, isopropylsulfenylpiperidine, tert-butylthiosulfenylmorpholine and the like.

Still another group of organic sulfenamides which are suitable for use in propellant systems wherein hypergolic fuels are utilized include those sulfenamides characterized by the formula

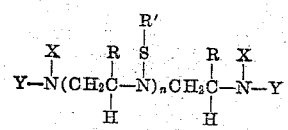

wherein X is a hydrogen atom or an SR′ group, at least one of which is SR′ groups, wherein Y is a hydrogen atom or an alkyl group containing not more than 6 carbon atoms, wherein R is a hydrogen atom or a methyl radical and n is a numeral selected from the group of 0 through 5 inclusive, and wherein R′ is an alkyl group containing from 2 to 12 carbon atoms. Typical compounds within this group include ethylene di(tertiary-butyl sulfenamide), propylene di(tertiary-butyl sulfenamide), triethylene tetra(tertiary-butyl sulfenamide), tetraethylene penta(tertiary-butyl sulfenamide), and the like.

The sulfenamides used in the fuel of the present invention are known in the art. U.S. Patent 2,520,400 to C. M. Himel et al. describes the production of sulfenamides by the interaction of sulfenyl halides with amines in the presence of an alkaline material such as sodium hydroxide or the like. U.S. Patent 2,520,401 to C. M. Himel et al. describes the production of thiosulfenamides by the interaction of thiosulfenyl halides with amines in the presence of an alkaline material such as sodium hydroxide. The compounds of the above-described type such as ethylene di(tertiary-butyl sulfenamides) and the like are prepared by the interaction of alkylene polyamines and polyalkylene polyamines with alkyl sulfenyl chlorides.

These organic sulfenamides are hypergolic per se and are also hypergolic with non-hypergolic materials particularly hydrocarbons even in a state of dilution of 30–60% by volume and in some cases as high as 80 to 90% and higher by volume. Suitable non-hypergolic diluents include the normally liquid hydrocarbons or mixtures thereof, particularly hydrocarbon fuels in the gasoline boiling range, jet fuels, n-heptane, benzene, kerosene, isooctane, diisobutylene, methylcyclohexane, toluene, and the like.

Other suitable oxidizers or oxidants for these hypergolic fuels in addition to white or red fuming nitric acid can be used in the bipropellant fuel compositions of our invention. Other suitable oxidants include materials such as hydrogen peroxide, ozone, nitrogen tetroxide, oxygen, and mixed acids, specifically anhydrous mixtures of nitric and sulfuric acids, such as 80–90 percent by volume white or red fuming nitric acids and 20–10 percent by volume anhydrous or fuming sulfuric acid. It is within the scope of this invention to employ, perferably dissolved in the oxidizer, ignition catalysts or oxidation catalysts. These oxidation catalysts include certain metal salts such as the chlorides and naphthenates of iron, zinc, cobalt and similar heavy metals.

The advantages of this invention are illustrated in the following examples. The reactants and their proportions and their specific ingredients are presented as being typical and are not to be construed as unduly limiting the invention.

EXAMPLE I

Each of the organic sulfenamides described hereinbelow was tested for spontaneous ignition employing fuming nitric acid as the oxidizer. In each test one part by volume of a mixture of a selected organic sulfenamide and n-heptane was dropped into a vessel containing 2.3 parts by volume fuming nitric acid. The mixture of the organic sulfenamide and n-heptane, upon coming into contact with the fuming nitric acid, ingited spontaneously. Normal heptane was employed as a diluent to determine the maximum amount of dilution that the sulfenamide could tolerate and still retain the property of being hypergolic. Tests were conducted at room temperature, i.e., about 70° F.

A series of alkylene polysulfenamides was tested for hypergolicity by the drop test method described above. These materials were prepared by the interaction of one mol of an alkylene polyamine with a sufficient amount of alkylsulfenyl chloride to theoretically add one alkyl sulfenyl (R—S) group to each nitrogen atom of the polyamine. For example 4 mols of tert-butylsulfenyl chloride was interacted with one mol of triethylenetetramine. Analysis of the product for nitrogen content indicated that a mixture of sulfenamides was formed. The mixture was probably comprised of $N^1$, $N^2$, $N^3$, $N^4$-tetra-(tert-butylsulfenyl) triethylenetetramine, and $N^1$, $N^1$, $N^4$, $N^4$-tetra (tert-butylsulfenyl) triethylenetetramine.

Results sets forth below of tests using the reaction materials of I, two mols of tert-butylsulfenyl chloride and one mol of ethylenediamine, II, two mols of tert-butylsulfenyl chloride and one mol of propylenediamine, III, four mols of tert-butylsulfenyl chloride and one mol of triethylenetetramine, and IV, 5 mols of tert-butylsulfenyl chloride and one mol of tetraethylenepentamine are recorded in Table No. 1 as follows:

Table No. 1

| Compound | Oxidant | Maximum Dilution, percent n-heptane |
|---|---|---|
| I. Ethylene di(tert-butyl sulfenamide). | Red Fuming Nitric Acid | 70 |
|  | White Fuming Nitric Acid | 70 |
| II. Propylene di(tert-butyl sulfenamide). | Red Fuming Nitric Acid | 70 |
|  | White Fuming Nitric Acid | 70 |
| III. Triethylene tetra (tert-butyl sulfenamide). | Red Fuming Nitric Acid | 60 |
|  | White Fuming Nitric Acid | 60 |
| IV. Tetraethylene penta (tert-butyl sulfenamide). | Red Fuming Nitric Acid | 60 |
|  | White Fuming Nitric Acid | 40 |

EXAMPLE II

Tests were conducted according to the method of Example I employing N-n-butyl-S-tert-butyl sulfenamide, N-cyclohexyl-S-tert-butyl sulfenamide, tert-butylthiosulfenylpiperidine, and tert-butylthiosulfenylmorpholine. Results are recorded in Table No. 2 as follows. Runs were made at room temperature.

Table No. 2

| Compound | Oxidant | Maximum Dilution, percent n-heptane |
|---|---|---|
| N-n-butyl-S-tert-butyl sulfenamide. | Red Fuming Nitric Acid | 20. |
|  | White Fuming Nitric Acid | 10. |
| N-cyclohexyl-S-tert-butyl sulfenamide. | Red Fuming Nitric Acid | 10. |
|  | White Fuming Nitric Acid | Ignition.[1] |
| Tert-butylthiosulfenylpiperidine. | White Fuming Nitric Acid | 10. |
| Isopropylsulfenylpiperidine. | Red Fuming Nitric Acid | 30. |
|  | White Fuming Nitric Acid | Ignition.[1] |
| Tert-butylthiosulfenylmorpholine. | Red Fuming Nitric Acid | Do.[1] |
|  | White Fuming Nitric Acid | Do.[1] |

[1] No dilution with hydrocarbon.

EXAMPLE III

Tests were conducted according to the method of Example I wherein the temperature of the fuel and the oxidant were lowered to −40° F. Results of tests using ethylene di(tertiary butyl sulfenamide), N-n-butyl-S-tertiary butyl sulfenamide, and N-cyclohexyl-S-tert-butyl sulfenamide are recorded in Table No. 3 as follows:

Table No. 3

| Compound | Oxidant | Maximum Dilution, percent n-heptane |
|---|---|---|
| Ethylene di(tertiary butyl) sulfenamide. | Red Fuming Nitric Acid | 50 |
|  | White Fuming Nitric Acid | 20 |
| N-n-butyl-S-tert-butyl sulfenamide. | Red Fuming Nitric Acid | 10 |
| N-cyclohexyl-S-tert-butyl sulfenamide. | Red Fuming Nitric Acid | 10 |

As will be evident to those skilled in the art, various modifications can be made or followed in the light of the foregoing disclosure or discussion without departing from the spirit or scope of the disclosure or from the scope of the claims.

We claim:
1. In the method for developing thrust by the combustion of bipropellant components in a combustion chamber of a reaction motor, the steps comprising separately and simultaneously injecting a stream of an oxidant component and a fuel component into the combustion chamber of said motor in such proportion as to produce spontaneous ignition, said fuel component comprising an organic sulfenamide selected from the group of sulfenamides consisting of compounds having the formula

wherein X is selected from the group consisting of a hydrogen atom and an —SR' group, wherein R is selected from the group consisting of alkyl and cycloalkyl groups containing from 3 to 8 carbon atoms and R' is an alkyl group containing from 2 to 7 carbon atoms, and the formula

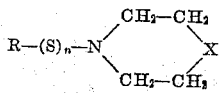

wherein R is an alkyl group containing from 2 to 12 carbon atoms, X is selected from the group consisting of an oxygen atom, a methylene group, and a sulfur atom, $n$ is a positive whole integer not above 2 and when X is an oxygen atom $n$ is 2, and the formula

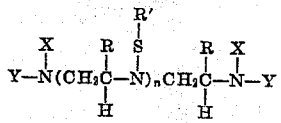

where X is selected from the group consisting of a hydrogen atom and an —SR' group, at least one of which is an —SR' group, wherein Y is selected from the group consisting of a hydrogen atom and an alkyl group containing not more than 6 carbon atoms, wherein R is selected from the group consisting of a hydrogen atom and a methyl group and $n$ is a numeral not above 5, and wherein R' is an alkyl group containing from 2 to 12 carbon atoms.

2. The method of claim 1 wherein said fuel component is dissolved in a non-hypergolic liquid hydrocarbon.

3. The method of claim 1 wherein said fuel component is triethylene tetra-(tert-butyl sulfenamide).

4. The method of claim 1 wherein said fuel component is tert-butyl thiosulfenylpiperidine.

5. The method of claim 1 wherein said fuel component is tert-butyl thiosulfenylmorpholine.

6. The method of claim 1 wherein said fuel component is ethylene di(tert-butyl sulfenamide).

7. The method of claim 1 wherein said fuel component is propylene di(tert-butyl sulfenamide).

8. A fuel composition consisting essentially of a liquid hydrocarbon in an amount within the range of 30 to 70 percent by volume and an organic sulfenamide in an amount within the range of 70 to 30 percent by volume, said organic sulfenamide being selected from the group of sulfenamides consisting of compounds having the formula

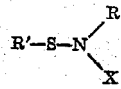

wherein X is selected from the group consisting of a hydrogen atom and an —SR' group, wherein R is selected from the group consisting of alkyl and cycloalkyl groups containing from 3 to 8 carbon atoms and R' is an alkyl group containing from 2 to 7 carbon atoms, and the formula

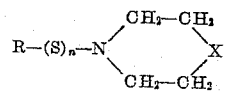

wherein R is an alkyl group containing from 2 to 12 carbon atoms, X is selected from the group consisting of an oxygen atom, a methylene group, and a sulfur atom, $n$ is a positive whole integer not above 2 and when X is an oxygen atom $n$ is 2, and the formula

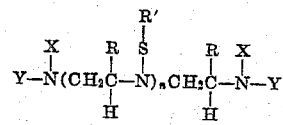

wherein X is selected from the group consisting of a hydrogen atom and an —SR' group, at least one of which is an —SR' group, wherein Y is selected from the group consisting of a hydrogen atom and an alkyl group containing not more than 6 carbon atoms, wherein R is selected from the group consisting of a hydrogen atom and a methyl group and $n$ is a numeral not above 5, and wherein R' is an alkyl group containing from 2 to 12 carbon atoms.

9. A fuel composition consisting essentially of a liquid hydrocarbon in an amount within the range of 30 to 70 percent by volume and ethylene di(tert-butylsulfenamide) in an amount within the range of 70 to 30 percent by volume.

10. A fuel composition consisting essentially of a liquid hydrocarbon in an amount within the range of 30 to 70 percent by volume and propylene di(tert-butyl sulfenamide) in an amount within the range of 70 to 30 percent by volume.

11. A fuel composition consisting essentially of a liquid hydrocarbon in an amount within the range of 40 to 60 percent by volume and triethylene tetra(tert-butyl sulfenamide) in an amount within the range of 60 to 40 percent by volume.

References Cited in the file of this patent

UNITED STATES PATENTS

| | | |
|---|---|---|
| 2,474,183 | King | June 21, 1949 |
| 2,489,051 | Sayward et al. | Nov. 22, 1949 |
| 2,520,400 | Himel et al. | Aug. 29, 1950 |